(No Model.)

A. HARMAN.
SAW GAGE.

No. 433,465. Patented Aug. 5, 1890.

Witnesses
Edw. A. Muir
J. P. Davis

Inventor
Ananias Harman
per R. G. Dorg.
his Attorney

UNITED STATES PATENT OFFICE.

ANANIAS HARMAN, OF ROANN, INDIANA.

SAW-GAGE.

SPECIFICATION forming part of Letters Patent No. 433,465, dated August 5, 1890.

Application filed May 29, 1890. Serial No. 353,542. (No model.)

*To all whom it may concern:*

Be it known that I, ANANIAS HARMAN, a citizen of the United States, residing at Roann, in the county of Wabash and State of Indiana, have invented certain new and useful Improvements in Saw-Gages; and I do hereby declare the following to be a full, clear, and exact description of the invention, such as will enable others skilled in the art to which it appertains to make and use the same.

My invention relates to gages for use in filing or dressing saw-teeth, and the object sought to be accomplished is to produce a more simple, cheap, and convenient device than has heretofore been in use, and one by means of which all the teeth will be of exactly uniform length, and hence the work of the saw more thorough and effective.

With these ends in view my invention consists in certain peculiarities of construction and combinations of parts, more fully set forth hereinafter, and pointed out in the claims.

Figure 1:
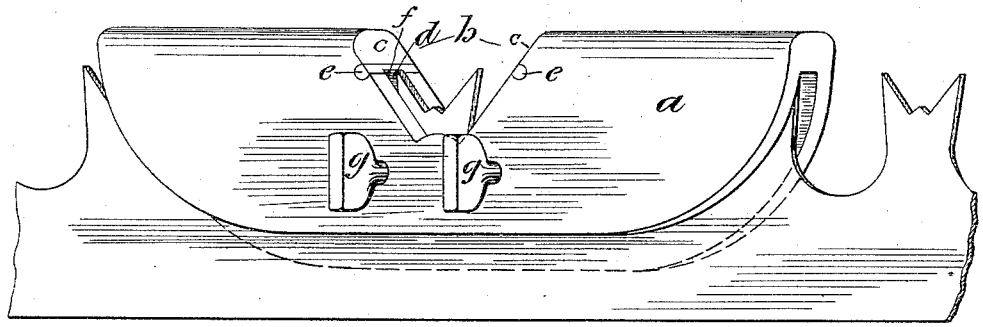
Figure 2:
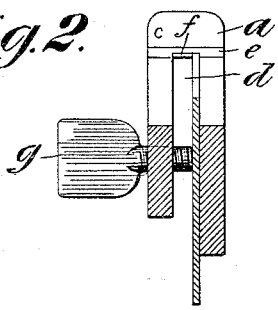
Figure 3:

Referring to the accompanying drawings, Figure 1 is a perspective view of my complete device, showing it applied; Fig. 2, a transverse section through Fig. 1, and Fig. 3 a detail view.

The reference-letter $a$ indicates the saddle-block, which is of the usual form, and is preferably made of case-hardened metal to render it impervious to the action of the file. At the middle of this block and extending down from its top edges is made a V-shaped or triangular opening $b$, thus forming opposite inclined faces $c$, which extend down into the block sufficiently to include a portion of the slot $d$ of said block. Pins $e$ extend across the upper ends of the slot $d$ and are secured transversely in the inclined surfaces $c$, lying flush therewith, and forming where they cross the slot shoulders $f$, against which the tooth to be filed abuts. These pins are made of steel, but retain their natural temper to allow filing them out at the center to form the shoulders $f$ at an angle to the inclined surfaces $c$ to conform to the straight portions of the tooth. Thumb set-screws $g$ are arranged in one side of the saddle-block to be used for clamping the gage on the saw.

The application and operation of my device may be briefly stated as follows: The saw is first securely clamped in a suitable vise and the gage fitted over it by causing the saddle-block to straddle the teeth. This block will be adjusted so that the tooth to be filed projects into the V-shaped opening $b$, and then the thumb-screws $g$ will be applied to clamp it to the saw. Now the point of the tooth will be caused to fit snugly up against the shoulder $f$ in the depression formed by the filing of the pin, and the file will then be applied to the tooth and the latter dressed down until the file comes in contact with and bears squarely against the inclined surface $c$. This tooth has now been completed, and the gage is released and slid along until the opposite one bears against the opposite shoulder $f$, when it will be treated in like manner to the first, and so on until all the teeth of the saw have been dressed down. Thus the teeth are of an exact uniform length, and hence the work of the saw is much cleaner and more thorough, whereas in saws where one tooth is made shorter than another, owing to an extra drawing of the file, the shorter tooth cannot perform its work properly, as the longer one following behind will prevent this from taking place, which is detrimental both as to the condition of the kerf made and the saw itself. It will be seen that the length of the teeth can be determined by the amount of filing out of the central portion of the pins, for the deeper these depressions are made the longer the tooth will be, and the shallower the shorter the tooth. When this filing has been carried too far, new pins can be fitted in the inclined surfaces in place of the old ones.

It is evident that my arrangement might be changed in many slight ways which might suggest themselves to a mechanical mind, and hence I do not limit myself to the precise construction herein shown, but consider myself entitled to all such slight variations as come within the spirit and scope of my invention.

Having thus described my invention, what I claim as new, and desire to secure by Letters Patent, is—

1. A saw-gage consisting of a saddle-block provided with an opening having inclined sides, and shoulders in the latter against which the tooth projecting into said opening is arranged to abut, substantially as and for the purpose described.

2. A saw-gage consisting of a saddle-block having an opening provided with inclined sides, and shoulders in the latter formed at an angle to them and against which the tooth projecting into said opening is arranged to abut, substantially as and for the purpose described.

3. A saw-gage consisting of a saddle-block provided with an opening having inclined sides, and pins of softer material than said inclined sides arranged transversely in the latter and constituting shoulders against which the tooth projecting into the opening is arranged to abut, substantially as and for the purpose described.

4. A saw-gage consisting of a saddle-block provided with an opening having inclined sides, and pins of softer material than said inclined sides and arranged transversely in the latter, their central portion being filed out to form shoulders against which the tooth projecting into the opening is arranged to abut, substantially as and for the purpose described.

In testimony whereof I affix my signature in presence of two witnesses.

ANANIAS HARMAN.

Witnesses:
L. M. SPOTTS,
G. E. HALDERMAN.